(12) United States Patent
Bennett, Jr. et al.

(10) Patent No.: US 6,441,361 B1
(45) Date of Patent: Aug. 27, 2002

(54) MOUNTING BRACKET FOR PRODUCT SENSOR

(76) Inventors: Dorris E. Bennett, Jr., 1190 Madison Creed Rd.; Dorris E. Bennett, Sr., 495 Hogan Branch Rd., both of Goodlettsville, TN (US) 37072; Jeffrey W. Bennett, 110 Meadow Pointe East, Hendersonville, TN (US) 37075; Yvonne B. Leggett, 497 Hogan Branch Rd., Goodlettsville, TN (US) 37072

( * ) Notice: Subject to any disclaimer, the term of this patent is extended or adjusted under 35 U.S.C. 154(b) by 0 days.

(21) Appl. No.: 09/356,591

(22) Filed: Jul. 19, 1999

(51) Int. Cl.$^7$ .............................................. G06M 7/00

(52) U.S. Cl. ..................... 250/221; 250/222.1; 250/239

(58) Field of Search .............................. 250/221, 222.1, 250/222.2, 239, 573; 340/555, 556, 557, 545.1, 546

(56) References Cited

U.S. PATENT DOCUMENTS

| | | | | |
|---|---|---|---|---|
| 3,785,337 A | * | 1/1974 | Flowerday | ................... 116/209 |
| 4,498,124 A | * | 2/1985 | Mayer et al. | ............... 362/211 |
| 4,605,850 A | | 8/1986 | Anselment | ................... 250/221 |
| 4,742,337 A | | 5/1988 | Haag | ......................... 340/556 |
| 4,912,316 A | * | 3/1990 | Yamakawa | .................. 250/221 |
| 5,583,334 A | | 12/1996 | Baumann | .................... 250/221 |
| 5,812,058 A | | 9/1998 | Sugimoto | ................... 340/556 |

* cited by examiner

Primary Examiner—Que T. Le
Assistant Examiner—Kevin Pyo
(74) Attorney, Agent, or Firm—Waddey & Patterson; David B. Pieper

(57) ABSTRACT

A mounting plate for a transmitting and receiving device. The transmitting and receiving devices are securably attached to the mounting plate so that adjustments are not necessary after the plate has been moved. The mounting plate has two mirror panels that reflect the signal generated by the transmitting device and two filtering plates for limiting the divergence of the beam of light to provide greater secured coverage of the area with only one transmitter and receiver.

15 Claims, 5 Drawing Sheets

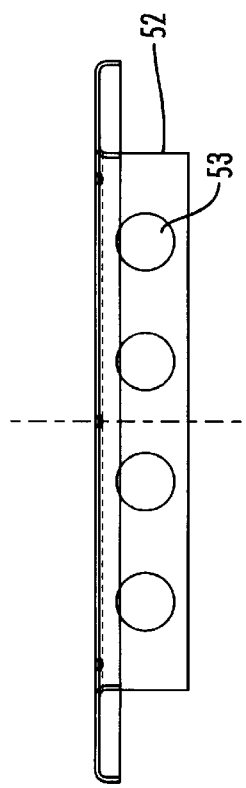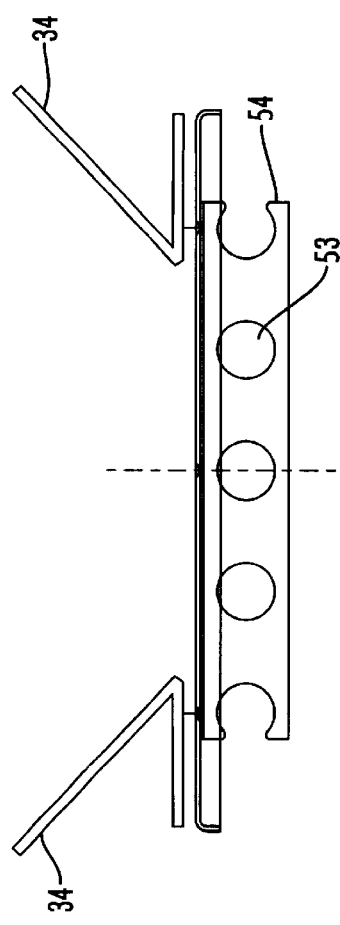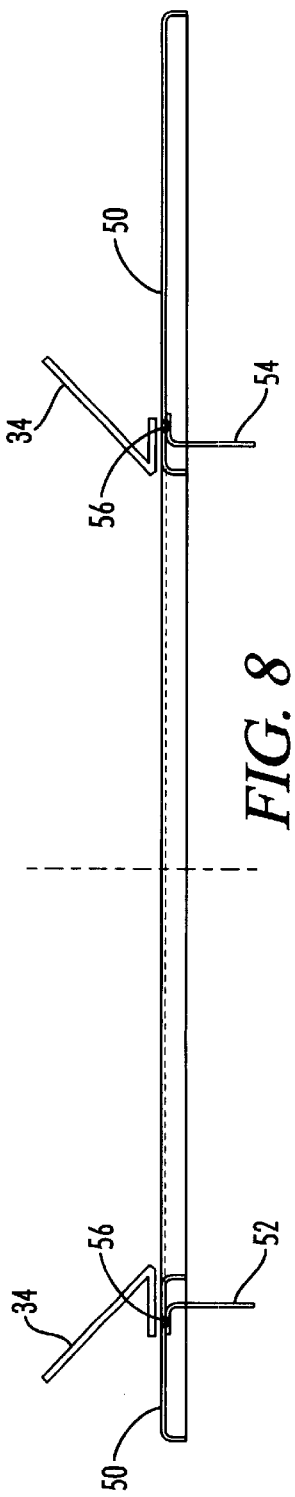

MOUNTING BRACKET FOR PRODUCT SENSOR

BACKGROUND OF THE INVENTION

The present invention generally relates to the mounting and protection of light sensors and their respective beams. More particularly, the present invention is directed towards the rigid mounting of the sensor equipment, combined with the reflecting and blocking of the light beams to provide a more reliable, and usable sensor for product detection in inaccurate product ejection systems.

Sensors have been widely used in the detection of product for many years. Prior art sensor beams utilize long an narrow conical beams for sensing product ejection. In most cases the sensors are used in their original manufactured state and the beams are altered by lenses and covers. This prior art method requires the ejected product to pass through a relatively small target area. When the ejection process is inaccurate, the randomly tossed product is difficult to detect consistently. This is due to the normal ejection error that may result in a product ejection path when the error is greater than twice the size of the area of the product.

In addition to the problems associated with the product ejection area, the variable mounting of prior art sensors has to be adjusted for proper alignment with the product flow. The adjustable mounting causes problems because the sensors may be moved accidentally or intentionally which can cause the sensing units to become mis-aligned and fail to detect the product flow.

A further problem associated with the prior art is the production debris that may be ejected along with the actual product being produced. Production debris has been an ongoing problem to sensors and the buildup of this debris requires a periodic cleaning of the sensor lenses. In dusty or dirty production environments this debris has severely limited or prevented the use of sensors because the constant cleaning down time of the sensors results in lost production time. In addition to the cleaning problems associated with the production debris, other problems, such as false sensing can also be attributed to this debris. If a sensor is designed to detect small products by increasing the resolution of the sensor, then the debris particles can break the sensing beam and result in an inaccurate sensing signal. Consequently, a need remains for a device to overcome these problems.

Previous monitoring or detection systems include U.S. Pat. No. 4,605,850; issued to Anselment et al. on Aug. 12, 1986; U.S. Pat. No. 4,742,337, issued to Haag on May 3, 1988; U.S. Pat. No. 5,583,334, issued to Baumann on Dec. 10, 1996; and U.S. Pat. No. 5,812,058, issued to Sugimoto et al. on Sep. 22, 1998. These patents are hereby incorporated by reference.

U.S. Pat. No. 4,605,850, issued to Anselment et al on Aug. 12, 1986 discloses a LIGHT BARRIER APPARATUS FOR MONITORING DOORWAYS. This patent teaches a device that has a central mount with a transmitter and a receiver that are mounted on a dye-cast support element. The design has two deflecting mirrors mounted on adjustable universal joints within a housing to deflect a beam of light to the receiver. The principal object of this invention is to provide a light sensor apparatus that does not require the whole apparatus to be changed when the apparatus is defective.

U.S. Pat. No. 4,742,337, issued to Haag on May 3, 1988 discloses a LIGHT-CURTAIN AREA SECURITY SYSTEM. This specification teaches an area coverage security system that provides a "curtain" for detecting a break in the light. The device further teaches the use of a series of transmitting and receiving strips wherein the transmitters send a signal that is reflected off of a reflection strip to be received by a receiver. The device provides a means for timing the signal (see col. 5, lines 32–48) to determine when a alarm should be sent, and thus providing sensitivity to keep the occurrence of false alarms small.

U.S. Pat. No. 5,583,334, issued to Baumann on Dec. 10, 1996, discloses a METHOD AND APPARATUS FOR THE DETECTION OF DEFECTIVE LIGHT TRANSMITTERS AND/OR RECEIVERS OF A LIGHT GRID FOR DETECTING OBJECTS IN A SURVEILLANCE AREA. This disclosure teaches a device having multiple light transmitters and the same number of light receivers that are positioned opposite of the transmitters. The device provides for the transmission of light by the transmitters and the reception of light by the receivers, with the beam of lights from the transmitter diverging to contact more than one receiver. The apparatus is then able to analyze the received signals to determine if an element (transmitter or receiver) is not operating properly.

U.S. Pat. No. 5,812,058, issued to Sugimoto et al., discloses a SECURITY SENSOR WITH BUILT-IN SIGHT. This invention teaches a security sensor having a receiver and a transmitter that are accommodated within a housing. See col. 3, lines 56–60. The security sensor is quipped with a sighting device in which the respective optical axes of the beam projector and receiver can easily and quickly be adjusted. The security device has an alarm whereby when the beam of light is broken, the receiver causes the alarm or warning display to so indicate.

In contrast to these patented systems, different manufacturing processes require different detection systems for varying product types. Some manufacturing production schemes require the product to be present during the operation and others may require the product to be absent. Thus, a sensor should also allow for detecting when a product is present and when a product is absent. The present invention provides a sensor mounting, reflecting, and protection device which satisfies the aforementioned needs.

SUMMARY OF THE INVENTION

A mounting plate for a light sensor with a reflective mirror, transmitting device and a receiving device. The reflective mirror, transmitting device, and receiving device are securably attached to the mounting plate of the invention so that aiming adjustments are not required. The permanent mounting of the transmitting device and the receiving device in alignment with the reflective mirror provide a stable environment that does not require realignment after the sensor has been moved. The mounting plate is designed with two mirrored panels that reflect the signal generated by the transmitting device and two filtering plates for limiting the divergence of the beam of light to provide greater secured coverage of the area with only one transmitter and receiver.

The present invention is particularly suited for mounting sensors that are used to monitor the absence of, or the presence of, product passing through the shaped sensing area. The present invention protects the sensors and reflectors from much of the manufacturing debris and thereby reducing the cleaning time normally associated with high production debris systems. The invention provides for fixed sensor and reflector alignments to eliminate user alignment of the system.

Accordingly, the present invention is directed to a sensor mounting device for the mounting of sensors, reflectors, debris guards, and beam masking to monitor product ejection with repeatability.

Yet another advantage of the present invention is directed towards a sensing device that can be mounted in any direction to accommodate many different types of machines and product detection.

A still further advantage of the present invention allows multiple devices to be mounted in a front to back configuration to obtain redundant sensing. The present invention may also be mounted in a side by side configuration to accommodate closely ejected multiple product systems where two or more parts ejected simultaneously.

One embodiment of the present invention includes a base that maintains alignment of the reflectors, sensors, and protective covers.

A further embodiment of the present invention adds debris guards to further protect the reflectors and sensors from debris.

Yet another embodiment of the present invention utilizes masks to block portions of the beam to de-sensitize standard sensor arrangements to eliminate small particle sensing.

Thus, the present invention utilizes reflected throughbeam photoelectric sensing to detect product being ejected, poured, extruded, or otherwise expelled from equipment. The small particles, drops of oil or other debris that may be associated with the expelled product can be ignored by the sensor. The present invention accomplishes these advantages with a combination of mechanical and electrical connections mounted within a case that is not easily tampered with.

BRIEF DESCRIPTION OF THE DRAWINGS

FIG. 6 is an end view of the reflector end mask of the present invention.

FIG. 7 is an end view of the sensor end mask of the present invention.

FIG. 8 is a side view of the reflector end mask and the sensor end mask mounted on the cover of the light sensing apparatus of the present invention.

DESCRIPTION OF THE PREFERRED EMBODIMENTS

Figure 1:
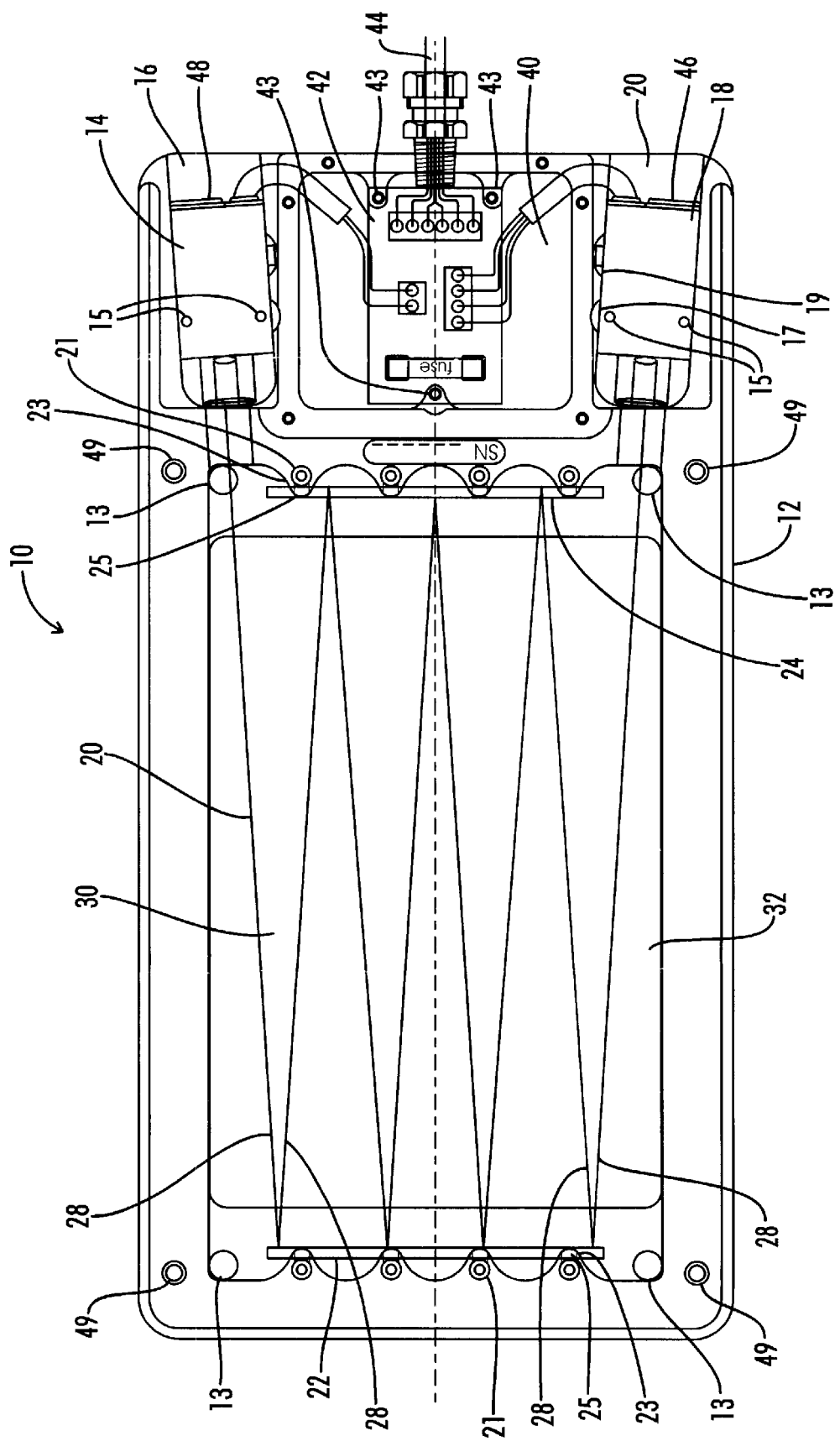
FIG. 1 is a top schematic view of the light sensing apparatus of the present invention.
Figure 2:
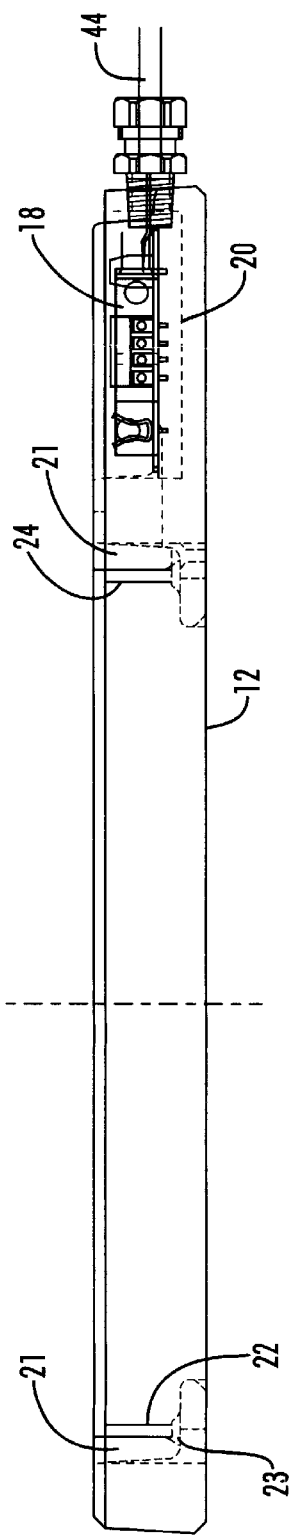
FIG. 2 is a side schematic view of the light sensing apparatus of the present invention.
Figure 3:
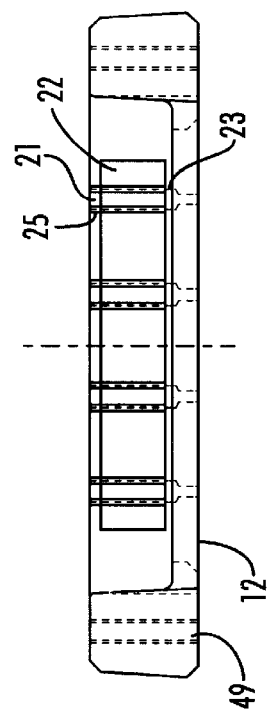
FIG. 3 is a reflector end view of the light sensing apparatus of the present invention.
Figure 4:
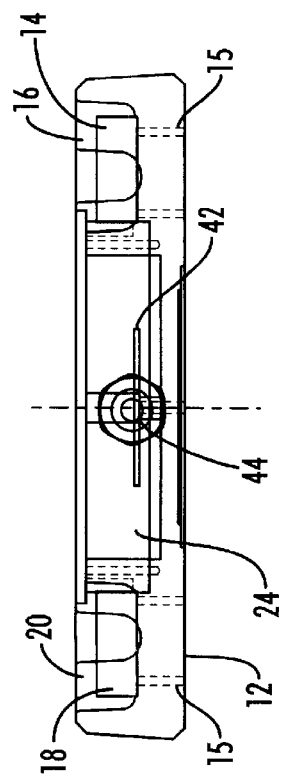
FIG. 4 is a cable end view of the light sensing apparatus of the present invention.

As shown in FIG. 1 of the drawings, a reflective-light, product-detection, sensing apparatus 10 consists of a mounting base 12, which positions a conventional light source emitter 14 in a first bin 16, and a photoelectric light receiver sensor 18 in a second bin 20. The light emitter 14 and the receiver 18 are rigidly mounted by mounting connectors 15 to the base 12 for proper alignment. Additional support for the light emitter 14 and receiver 18 are provided by the close tolerances within the bins 16 and 20 which hold the light emitter 14 and the receiver 18 tightly in position. This configuration allows the light sensing apparatus 10 to be transported without disturbing the positioning of the emitter 14 or the receiver 18. Therefore, the light sensing apparatus 10 may be transported without requiring re-calibration.

The light sensing apparatus 10 utilizes an emitter 14 to generate a beam of light 20. The beam 20 travels from the emitter 14 to a first light reflector 22. The beam 20 is reflected from the first light reflector 22 to the second light reflector 24 where it is redirected back to the first light reflector 22. The beam 20 is reflected between the first light reflector 22 and the second light reflector 24 to adequately cover the detection area 32 for the size of product being detected. The beam 20 is reflected at an angle so that the reflected beam 20 is directed into the receiver 18. If the beam 20 is not blocked or broken, a continuous signal will be provided at the receiver 18. If the beam 20 is broken, the signal will stop which can alert the user. The signal may also be inverted to allow for a product absence detector as further described herein.

The base 12 is also known as a rigid mounting surface 12. The base 12 is manufactured from a heavy duty cast aluminum to provide a rigid mounting surface for the detectors, and provide a tamper and impact resistant housing for the detector 10. The base 12 provides a solid foundation for mounting the light source 14, the light sensor 18, and the light reflectors 22 and 24. The solid foundation of the base 12 allows the light source 14, light sensor 18, and light reflectors 22 and 24 to be permanently positioned for proper operation. The base 12, which is typically an inch to two inches high allows the apparatus 10 to be attached to pre-existing machines or assembly lines to determine when a product is being delivered. The base 12 also includes a device mounting location 49 for mounting the apparatus 10 near a product ejection area.

Drain holes 13 in the base 12 casting are provided to avoid a build up of oil or cleaner in the base 12. These drain holes 13 allow for cleaner to be sprayed onto the light reflectors 22 and 24 without disassembling the device 10. Once the cleaner has been sprayed onto the light reflectors 22 and 24, the cleaner will drain off of the light reflectors 22 and 24 and may drain through the drain holes 13 and out of the device 10. This allows for easy cleaning of the device 10 without a significant cost of time to the user.

A printed circuit board 42 is mounted to the base 12, by a 3 point system 43 to help eliminate stress on the circuit board 42 during rough handling or in impact situations. The board 42 is enclosed inside the base 12 behind an internal protective cover 40. This cover also protects all of the internal connections between the light source 14, light receiver 18, and the connecting cable 44. The light source 14, light receiver 18, and the light reflectors 22 and 24 are firmly mounted and held in alignment by the aluminum base 12 and no alignment adjustments are needed or provided with the device 10.

The light emitter 14 and the receiver 18 are conventional units as widely used in the prior art. For purposes of this application, the light emitter 14 is also known as a light source 14, and the receiver sensor 18 is also known as a light receiver 18. The light receiver 18 generates and controls an output signal that may be monitored for detecting a change in the status of the light beam 20 being received by the light receiver 18.

The mounting connectors 15 hold the light emitter 14 and the light receiver 18 in position on the base 12. The mounting connectors 15 may be any type of connection that is appropriate for mounting items to the base 12. Known mounting connectors 15 that are appropriate for the present invention include pins, screws, welds, rivets, glue, bolts, zip ties, and other secure methods that are conventionally known in the art of connectors.

The first bin 16 is snapped in association with the connectors 15 to properly align the light source 14 within the base 12. The second bin 20 is similarly snapped to properly align the light receiver 18 within the base 12. The proper position of the light source 14 and the light receiver 18 is determined by the number of reflections 28 used in the application and the distance between the reflectors 22 and 24 in the base 12. This determination is standard for light transmission systems and thus, will not be described in further detail. Once the proper position has been determined, the light source 14 and the light receiver 18 can be permanently mounted to the base 12 without requiring further adjustment or re-alignment of the device 10 during operation.

The double strength reflectors 22 and 24 are permanently attached on a unique adhesive-based, shock-resistant mounting where the alignment of the reflectors 22 and 24 has been machined directly into the base 12. The reflectors 22 and 24 are mounted to lower holding peaks 23 by an elastic adhesive substance 25. This mounting configuration provides a series of peaks 23 and cylinders 21 which hold the elastic adhesive substance 25 such as glue or some other type of mounting substance. The elastic adhesive 25 holds the light reflectors 22 and 24 in place on the cylinders 21 and the peaks 23. This mounting configuration protects the light reflectors 22 and 24 from breaking during transportation and use of the apparatus 10. An additional advantage of this mounting configuration allows for the reflectors to work even if the reflectors break during transportation or use of the apparatus 10. Because the light reflectors 22 and 24 are supported in multiple locations, an individual break or crack in the light reflectors 22 and 24 will not affect the angle of reflection of the light due to the support provided by other locations.

The first light reflector 22 is used to reflect the light beam 20 from the light source 14 towards the light receiver 18 to form a detection area 32. The second light reflector 24 redirects the light beam 20 back towards the first light reflector 22. In this manner, the light beam 20 travels between the first light reflector 22 and the second light reflector 24 to cover the opening of the light detection area 32. The path across the detection area is called a reflection 28. The path from the light source 14 to the first reflector 22 is also called a reflection 28, as is the path from the first reflector 22 into the light receiver 18.

A reflection 28 is one segment of the path traveled by the light beam 20 between the light source 16 and the light receiver 18. By increasing or decreasing the number of reflections 28 in the path of the light beam 20, the sensitivity of the light sensor 10 to various sizes of objects may be adjusted. As the number of reflections 28 is increased, the open area 30 between the reflections 28 is decreased and smaller products may be detected. Conversely, as the number of reflections 28 is decreased, the open area 30 is increased and the associated size of the product that will be detected is increased. The maximum number of reflections 28 is limited by the strength of the light emitter 16, the efficiency of the light reflectors 22 and 24, the sensitivity of the light sensor 18, and the clarity of the air or other background medium associated with an empty product detection area 32.

The number of reflections 28 is controlled by the angle positioning of the light source 14 and the light receiver 18 to the light reflectors 22 and 24. Additional adjustments may be made when determining the size of the device 10 by adjusting the distance between the light reflectors 22 and 24. An alternative embodiment of the sensor 10 would locate the light source 14 and light receiver 18 on opposite sides of the detection area 32 so that an odd number of reflections 28 could be used to cover the detection area 32. Thus, a light sensor 10 could be constructed with three reflections 28, where the first reflection 28 travels from the light source to the first reflector 22, the second reflection 28 travels from the first reflector 22 to the second reflector 24, and the third reflection 28 travels from the second reflector 24 to the light receiver 18.

The product detection area 32 is shaped to allow for a mounting location in proximity to said a product ejection area on a machine or supply line. The product detection area 32 may be a circle, square, rectangle, polygon, oval or any other shape that allows for the product to pass through an opening where the light beam 20 may be directed between the light source 16 and the light receiver 18.

The light source 14, light receiver 18, the light reflectors 22 and 24, the circuit board 42, and other internal components are protected by an external protective cover 50. Attached to the cover 50 are splashguards 52 and 54 to further protect the components of the sensor 10. The components include the light source 14, light receiver 18, and reflectors 22 and 24. The splashguards 52 and 54 protect the components from an impact and/or contact from the product and/or debris associated with the manufacturing process or environment. The outside cover assembly 50 is made from an attractive brushed stainless steel and appropriately marked with a use warning. Other materials such as plastics, natural products, metals, or other items may be used which are suitable for the mounting location of the light sensing apparatus 10.

The reflective light sensing apparatus 10 utilizes an external product guide 34 that is mounted to the guide mounting location 36 on the cover 50. The guide 34 directs the product that is being detected into, through, and out of the detection area 32. The external product guide 34 is shown in FIGS. 6–8 as mounted on the cover 50 of the apparatus 10.

Figure 5:
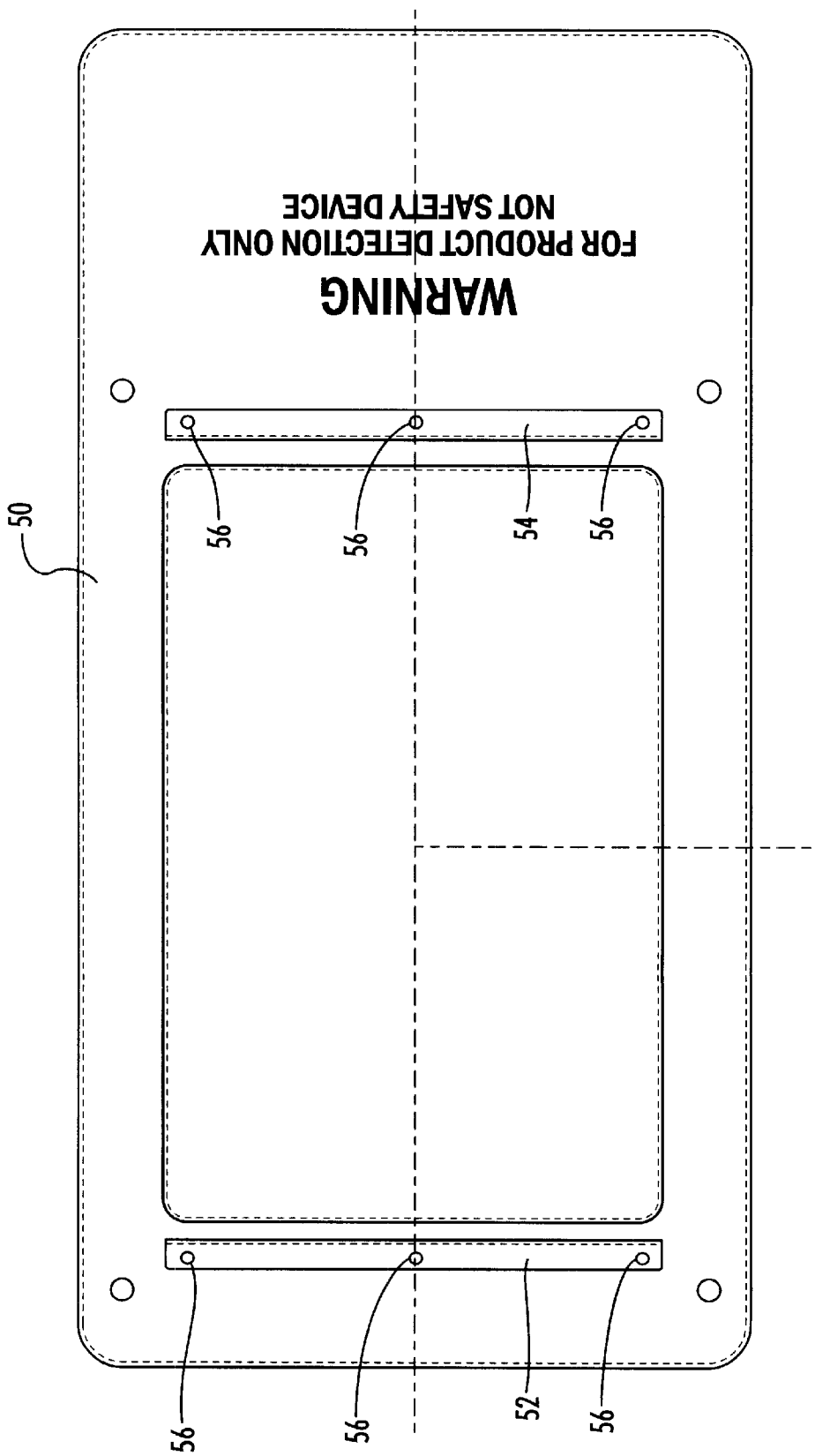
FIG. 5 is a top view of the cover of the light sensing apparatus of the present invention.

FIGS. 5–8 of the drawings show the mounting of the splashguards 52 and 54 which are also known as the first mask 52 and second mask 54. The splashguards 52 and 54 are constructing with masking holes 53 to form a first mask 52 and second mask 54 for controlling and shaping the beam 20. FIG. 5 shows a top view of the cover 50 with the first mask 52 and the second mask 54 mounted to the mask mounting locations 56. FIG. 6 is a front view of the first mask 52 that is used in coordination with the first reflector 22. FIG. 7 is a front view of the second mask 54 that is used in co-ordination with the second reflector 24. The masks 52 and 54 are positioned in front of the light reflectors 22 and 24 to block the secondary light that is not a part of the direct beam 20. The masks 52 and 54 allow the receiver 18 to be more sensitive to a break in the beam 20 by reducing the loss in sensitivity that is associated with stray secondary light contacting the light receiver 18.

Figure 9:
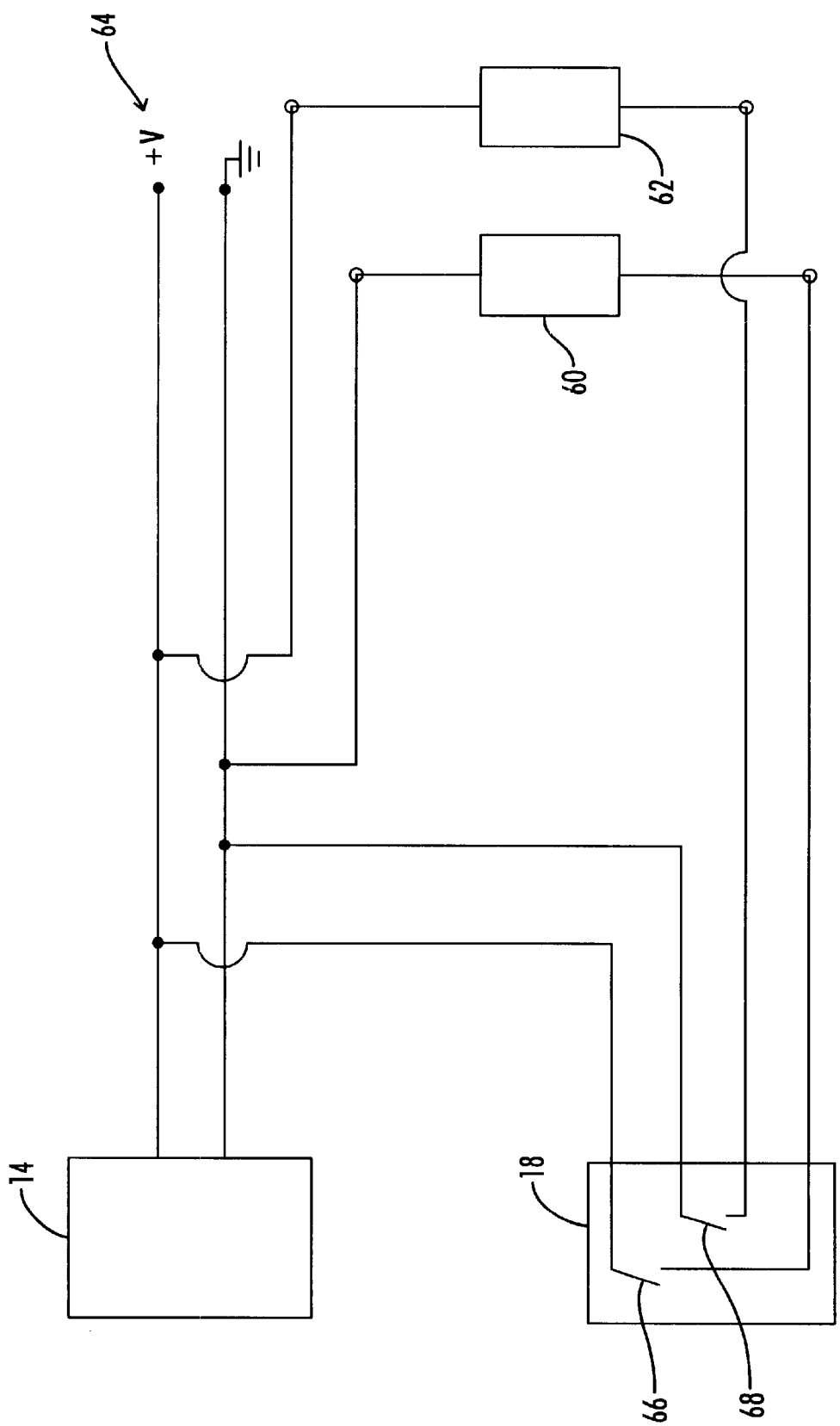
FIG. 9 is an electrical schematic of the sensing apparatus of the present invention.

As shown in FIG. 9 of the drawings, a simplified electrical schematic of the wiring diagram for the sensing device 10 allows for a DC type source or sink style of electrical signal to be connect to the device 10. An alternative embodiment of the present invention may also use an alternating current style of sensors. However, the alternating current style of sensors will not generate the sourcing and sinking signals that the direct current style of device 10 will provide. In the preferred embodiment, the device 10 will utilize direct current power supplies and sensors and this embodiment will be further described herein. The device 10 is connected to a power supply so that the device 10 will supply both sinking and sourcing signals to accommodate most controls. These signals can be used at the same time should the need arise. The device 10 provides dual sensing-signal outputs in the form of a sourcing signal output and a sinking signal output. An input voltage 64 is connected to provide power to the light source 14 and the light receiver 18. The switch contacts 66 and 68 within the receiver 18 can be set in two different switching positions by a selector switch 19. The first switching position provides for the contact to be closed when a light signal is detected. The second switching position provides for the contacts to be open when a light signal is detected. This method of providing an output signal is common in the prior art and will not be described in further detail. The first output from the light receiver 18 may be connected to provide power to a sourcing signal load 60 so that the sourcing load 60 may receive power when the sourcing receiver switch 66 is closed. A second output from the light receiver 18 may be connected to provide power to a sinking signal load 62 so that the sinking load 62 may dump power when the sinking receiver switch 68 is closed. Separate wire pairs for sinking and sourcing signals are supplied for maximum flexibility of custom installations to a broad range of external components.

The final installation of the apparatus 10 is made easy by the absence of the alignment requirements of other sensor devices. The apparatus 10 is assembled into one rigid unit and does not require an alignment adjustment to the photo-electric sensors. A 10-foot connector cable 44 is sealably attached to the detector 10 and the other end is stripped, tinned, and color-coded, ready for connection to the monitoring equipment. The conductor seal is maintained by means of a liquid tight strain relief compression fitting.

Two indicator lights 46 and 48 are provided for the sensors. The first indicator light 48 shows that power is being supplied to the light source 14. The second indicator light 46 is used to show the status of the detector 18 as receiving the light beam 20. These indicators 46 and 48 are visible from a distance and make supervision of the detector simple.

The apparatus 10 is attached to the equipment to be monitored using at least two of the four mounting holes 49. The apparatus 10 should be mounted in such a manner as to allow the product to pass through the detecting area 32 when expelled from the manufacturing process. Movement and oscillation of the detector 10 are of no importance as long as the detector will not migrate into the moving parts of the monitored equipment, or shift enough to prevent the product from passing through the detection area 32.

Light and dark operation is important if your manufacturing equipment does not use a timing signal for a cycle. This is usually the case in extrusions, pouring, monitoring overflows, or any continuous process that is not cyclic. In these cases the process begins and remains constant until the equipment is deliberately stopped. To select the proper operation mode for your equipment you must decide if absence of product or presence of product causes your equipment to fail. To change between light and dark operation modes a rotary selector switch 19 is provided on the photoelectric receiver 18.

Any number of external problems could cause signal loss from the detector including a broken or loose connection, a transformer failure, or cut connections coming from the detector after the equipment is started. If the proper operation mode has not been selected your equipment will continue to run with the detector disabled. Using the light and dark operating modes properly will prevent this from happening.

When the selector switch 19 is set to the first position, the apparatus 10 is operating in the light operated mode. On power up the receiver will see light and will close the switches 66 and 68 to turn on the output to the sinking and sourcing signal wires. When product passes into the detection area 32, the product blocks a significant amount of the light beam 20 and the signals are turned off until the product exits the detection area 32.

When the selector switch 19 is set to the second position, the apparatus 10 is operating in the dark operated mode. On power up the receiver 18 will see light and will not turn on the sinking and sourcing signals. When product passes into the detection area 32 it blocks a significant amount of the light beam 20 and the signals are turned on until the product exits the detection area 32.

The apparatus 10 can be rotated and tilted to any angle to suit the ejection path of the product. In some cases it may be advantageous to rotate or tilt the detector 10 for a wider profile of a thin part. This can make a normally undetectable product detectable.

In addition, the devices can be mounted in a front to back configuration to obtain redundant sensing. By placing a first sensor so that its detection area is located in alignment with a second sensor's detection area, a product may be made to pass through both the first and second sensor detection areas. This will allow for the first sensor to send a first signal and a second sensor to send a second signal so that a redundant signal is obtained by the sensor system. This type of mounting provides a series relationship for the sensors. The present invention may also be mounted in a side by side, or parallel, configuration to accommodate closely ejected multiple product systems where two or more parts ejected simultaneously.

A gain adjustment 17 is provided on the receiver 19. Adjustments are set to obtain a balance between part size and the pollutants associated with an operating environment. Increasing the gain will allow for the detection of smaller product profiles but will make the detector more sensitive to environmental conditions. Decreasing the gain will increase the required product profile and decrease the environmental sensitivity. In most cases adjustments are not needed to the gain adjustment 17.

By creating a detection area 32 for the product to pass through the variation of the product ejection path is not as critical. Most manufacturing system's ejection path consistency can be extremely poor. The present device 10 will allow the product to be detected as long as it passes through the detection area 32. In extreme cases where product occasionally is ejected poorly and does not pass through the detection area 32, accessory entry guides can be mounted in the accessory mounting holes to help 'funnel' the product into the detection area 32.

The detector 10 should be positioned to allow the average ejection path of the product to pass through the center of the detection area 32. The detector 10 should be placed as close to the ejection point as possible without incurring damage from moving parts of the equipment. This will allow the detector 10 to signal the condition of the product as early as possible in the cycle. In fast moving equipment this can reduce the effects of an occasional slow ejection of product. Fasten the detector in place using at least two of the four tapped mounting holes 49 provided. As long as the detector 10 does not move enough to allow the product to miss the detection area 32 the mounting will work.

Thus, although there have been described particular embodiments of the present invention of a new and useful Mounting Bracket for Product Sensor, it is not intended that such references be construed as limitations upon the scope of this invention except as set forth in the following claims.

What is claimed is:

1. A reflective light sensor for detecting a product, comprising:
   a light source for generating a light beam;
   a light receiver with an output signal for detecting said light beam from said light source;
   a first light reflector for reflecting said light beam from said light source towards said light receiver to form a detection area; and
   a rigid mounting surface for permanently and directionally aligning said light source, said light receiver, and said first light reflector wherein directionally aligning said light source eliminates the necessity for a redirecting lens.

2. The reflective light sensor of claim 1, further comprising:
   drain holes located in said rigid mounting surface.

3. The reflective light sensor of claim 1, further comprising:
   a first bin located in said rigid mounting surface for said light source, the first bin adapted to properly align the light source in the rigid mounting surface; and
   a second bin located in said rigid mounting surface for said light receiver, the second bin adapted to properly align the light receiver in the rigid mounting surface.

4. The reflective light sensor of claim 1, further comprising:
   a gain adjustment on said light receiver for controlling the sensitivity of said light receiver.

5. The reflective light sensor of claim 1, further comprising:
   a selector switch for controlling said output signal.

6. The reflective light sensor of claim 1, further comprising:
   cylinders and adhesive for mounting said first light reflector.

7. The reflective light sensor of claim 1, further comprising:
   peaks and adhesive for mounting first light reflector.

8. The reflective light sensor of claim 1, wherein said first light reflector is flat, the reflective light sensor further comprising:
   a second flat light reflector for reflecting said light beam from said first flat light reflector back towards said first flat light reflector.

9. The reflective light sensor of claim 1, further comprising:
   an external product guide mounted on said rigid mounting surface, whereby said guide directs said product into and out of said detection area.

10. The reflective light sensor of claim 1, further comprising:
    a device mounting location on said rigid mounting surface for mounting said device in proximity to a product ejection area.

11. The reflective light sensor of claim 1, further comprising:
    a device mounting location on said rigid mounting surface for mounting reflective light sensors in a series relationship.

12. The reflective light sensor of claim 1, further comprising:
    a splashguard for protecting components of said sensor.

13. The reflective light sensor of claim 8, further comprising:
    dual sensing signal outputs for monitoring said output of said sensor.

14. The reflective light sensor of claim 1, further comprising:
    a first mask in association with said first light reflector, wherein said first mask reshapes said light beam from said light source.

15. A reflective light sensor for detecting a product, comprising:
    a light source for generating a light beam;
    a light receiver with an output signal for detecting said light beam from said light source;
    a first light reflector for reflecting said light beam from said light source towards said light receiver to form a detection area;
    a rigid mounting surface for permanently aligning said light source, said light receiver, and said first light reflector;
    a second light reflector for reflecting said light beam from said first light reflector towards said light receiver; and
    a second mask mounted in association with said second light reflector, wherein said second mask reshapes said light beam from said light source.

* * * * *